United States Patent Office 2,802,807
Patented Aug. 13, 1957

2,802,807

PRODUCTION OF POLYMERS FROM A CYCLIC CARBONATE OF AN ALKYLENE GLYCOL WITH A MONO-ESTER OF A DICARBOXYLIC ACID AND A MONO HYDROXY COMPOUND

James Gordon Napier Drewitt, Spondon, near Derby, and James Lincoln, London, England, assignors to British Celanese Limited, a corporation of Great Britain No Drawing. Application April 25, 1955,
Serial No. 503,796

Claims priority, application Great Britain April 27, 1954

15 Claims. (Cl. 260—45.4)

This invention relates to improvements in the production of polymeric compounds and more particularly linear polyesters.

According to United States application S. No. 302,822, filed August 5, 1952, linear polyesters are produced by condensing a free dicarboxylic acid with a cyclic glycol carbonate, for example cyclic ethylene carbonate, cyclic trimethylene carbonate and the cyclic carbonate of propylene glycol. While the invention of that specification may be applied to the production of linear polyesters from glycols and aliphatic dicarboxylic acids such as adipic acid, suberic acid and sebacic acid, or aromatic aliphatic acids such as paraphenylene diacetic acid, its principal advantages are obtained in the production of high melting polyesters using aromatic dicarboxylic acids which are refractory in the sense that they are high melting and difficult to dissolve, and in particular terephthalic acid. By using a cyclic glycol carbonate a smoother reaction is achieved, since the reaction mixture becomes homogeneous more readily than is the case when the free dicarboxylic acid is reacted with the free glycol.

According to the present invention a linear polyester is produced by heating together a cyclic glycol carbonate and the mono-ester of a dicarboxylic acid with a monohydroxy compound which is volatile under the conditions employed until a polymer is produced. In common with the process described in the above-mentioned application, the present process proceeds very smoothly even when preparing a polyester of a high melting dicarboxylic acid. A clear homogeneous melt is produced at an early stage of the polymerisation in contrast with the long period required to produce a homogeneous melt when reacting the free dicarboxylic acid with the free glycol.

In the United States application corresponding to British application No. 9729/54 filed April 2, 1954, we have described a method of working, particularly adapted for continuous polyesterification, in which the raw materials, in that case the free dicarboxylic acid and the cyclic carbonate, are added to an already formed low polymer, preferably of the same constituents; that is to say, if terephthalic acid and ethylene carbonate are to be condensed, these two reagents are preferably added to a low polymer produced from terephthalic acid and cyclic ethylene carbonate or of course from dimethyl terephthalate and ethylene glycol. This method is equally applicable to the present invention using as the starting materials the cyclic glycol carbonate and the mono-ester of the dicarboxylic acid. Thus, a small quantity of the monomeric reagents may be mixed with an approximately equal quantity of low polymer. After heating the mixture to form a clear homogeneous melt, a further quantity of monomeric reagents roughly equal to the total quantity of low polymer present may be added. The process may then be repeated, if desired after withdrawing some of the low polymer.

It is convenient in this method of working to carry out the whole process in three stages, in the first of which the monomeric materials are fed to the pre-formed low polymer and the reaction is carried out at atmospheric pressure under reflux, in the second of which heating is continued at atmospheric pressure or under a low vacuum, and in the last of which heating is continued under a high vacuum, for example an absolute pressure of 2–10 mms. of mercury. In the first stage, in which the polyesterification is carried to the low polymer stage under reflux, some of this low polymer is removed and further condensed to the desired high polymer while the rest is used as the medium for esterification between a further quantity of the monoester of the dicarboxylic acid and cyclic glycol carbonate. By this process continuity of operation, at least to the low polymer stage, is comparatively readily achieved. Thus, the monomeric reagents may be added slowly to a relatively large mass of molten low polymer maintained at the appropriate temperature and under reflux, the reaction mixture being continuously stirred to form a homogeneous melt of low polymer, part of which is drawn off at an equivalent rate to that at which the monomeric reagents are added, so as to keep the volume of the reaction mixture constant. Alternatively, the monomeric reagents may be fed to a tower maintained at the appropriate temperature and under reflux, the reaction mixture consisting of molten low polymer being drawn off at the bottom; in this case, if desired, part of the reaction mixture can be returned to the top of the tower and part transferred to a polymeriser for the next stage.

Even when working the first stage as a continuous process, it is usually simpler to carry out the second and third stages of the polymerisation as batch operations. If desired the output of several reactors in which the first step is carried out may be blended before being fed to one or more polymerisation vessels, in which the second and third stages are carried out. It is preferred to use a few relatively large continuously operating first-stage polymerisation vessels, a blending tank and several relatively small batch autoclaves. The first-stage vessels feed the molten, low-molecular weight polymer to the blending tank which feeds to each in turn of the batch autoclaves, where the second and third stages are carried out.

The low polymer into which the monomeric reagents are fed according to this method of working should have an intrinsic viscosity of the order of 0.1–0.4 and preferably 0.15–0.3. In this specification the term "intrinsic viscosity" means the value of $\log_e (\eta_r/c)$, where $\eta_r$ is the relative viscosity of a solution of $c$ grams of the polymer in 100 cc. of meta-cresol, $c$ being of the order of 1 gram. It is convenient to use a low polymer having an intrinsic viscosity of the order of 0.25 since at this stage the polymer is still fairly fluid and therefore can be readily mixed with the incoming monomeric reagents and at the same time condensation is quite well advanced.

During the condensation and in any of the other stages stirring may be resorted to and indeed is of advantage since generally the reaction mixtures are of relatively low thermal conductivity.

The invention may be applied to the production of polymers from the glycols and dicarboxylic acids mentioned in U. S. application S. No. 302,822. As in the above-mentioned specification aliphatic or aromatic aliphatic dicarboxylic acids may be used, but the invention is most advantageous in making high-melting polyesters from glycols and the monoesters of high-melting aromatic dicarboxylic acids. Such aromatic acids include terephthalic acid and certain substituted terephthalic acids, diphenyl-4,4'-dicarboxylic acid, $\alpha,\beta$-diphenylethane-4,4'-dicarboxylic acid, $\alpha,\delta$-diphenylbutane-4,4'-dicarboxylic acid and other $\alpha,\omega$-diphenylalkane-4,4'-dicarboxylic acids, $\alpha,\beta$- diphenoxyethane-4.4'-dicarboxylic acid, α.δ-diphenoxybutane-4.4'-dicarboxylic acid and other α.ω-diphenoxyalkane-4.4'-dicarboxylic acids, and the 1.5-, 2.6- and 2.7-naphthalene-dicarboxylic acids. All these dicarboxylic acids have their carboxy groups linked to the aromatic nucleus or nuclei in such a way that (taking the shortest path through the carbon atoms of the nucleus) there are at least four nuclear carbon atoms in each nucleus between the linkages. In this definition a single benzene ring or a single naphthalene ring counts as one aromatic nucleus, while diphenyl

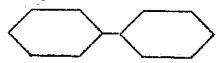

and diphenyl alkane

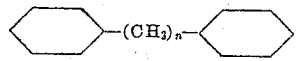

count as two aromatic nuclei. The preferred dicarboxylic acids are those whose carboxy groups are linked to the aromatic nuclei in diametrically opposite positions, that is to say in the para position with a single benzene nucleus, in the 4.4'-position with compounds containing two benzene nuclei, and in the 1.5 or 2.6 positions with compounds of the naphthalene series.

Suitable monoesters of dicarboxylic acids for use in accordance with the invention include the mono-methyl, -ethyl, -isopropyl, -cyclohexyl and -phenyl esters of terephthalic acid and the other high-melting aromatic dicarboxylic acids mentioned above. The mono-esters of these dicarboxylic acids have the advantage over the free acids that they can be purified comparatively easily, e. g. by recrystallisation either from water or from a readily available organic solvent. For example, mono-methyl terephthalate may be recrystallised from solution in hot water, the mono-ethyl ester from solution in benzene and the mono-isopropyl ester from solution in hot benzene. The mono-esters may readily be produced, without first forming the diester, by oxidation of corresponding para-alkyl benzoic esters, for example the corresponding para-toluic esters or the corresponding para-cumic esters. Such oxidation may be carried out by means of oxygen or air or by means of nitric acid or similar oxidising agent in a known way.

The proportion in which the cyclic glycol carbonate is employed has an important bearing upon the nature and the constitution of the product. For example, when cyclic ethylene carbonate is heated with monomethyl terephthalate in a molar ratio of between 1.0 and 1.3 moles of cyclic carbonate to 1 mole of monomethyl terephthalate, a product is produced having a melting point and other properties very close to those of the polyester produced directly from ethylene glycol and dimethyl terephthalate. If, however, the cylic glycol carbonate is used in a higher proportion, for example 2 moles of cyclic carbonate to 1 mole of monomethyl terephthalate, the product, while still crystalline, fibre-forming and capable of being cold drawn, has a lower melting point. For some purposes and with some reagents this is an advantage. Thus, for instance, the polymer from diphenyl-4.4'-dicarboxylic acid and ethylene glycol melts at a temperature rather too high for ease of melt spinning. In such a case it is possible, according to the present invention, to use the monoester of the dicarboxylic acid and excess cyclic glycol carbonate so as to achieve polymer having a lower melting point.

A polyester derived from a dicarboxylic acid and two or more different glycols may be produced according to the present invention by using the mono-ester of the dicarboxylic acid and a mixture of the cyclic carbonates of the two glycols. Alternatively the cylic carbonate of one of the glycols may be used together with the other glycol in the free state. In such a case it is advisable to use the free glycol in a proportion such that the mixture of it with the cyclic glycol carbonate still has a high solvent power for the mono-ester used. This production of mixed polyesters constitutes another method by which polymers melting in the range suitable for melt spinning, e. g. 230 or 240–280° C., may be produced using mono-esters of dicarboxylic acids such as diphenyl-4.4'-dicarboxylic acid, which with a single glycol such as ethylene glycol normally produce polymers which are too high melting.

Generally the temperature employed for the polymerisation is about 250–300° C. though if there is any tendency to charring in the early stages, such early stages may be carried out at a lower temperature, for example 200° C. Usually, however, these mono-esters of the high-melting dicarboxylic acids have melting points of 250° C. or lower and hence are molten under the conditions of polymerisation and soon form homogeneous mixtures with the cyclic glycol carbonate.

The reaction may be carried out in the presence of an ester-interchange catalyst, for example one or more of magnesium, sodium and lithium and their alkoxides and salts with terephthalic acid. Such a catalyst may be added at the beginning of the reaction or may be added at the point when the reaction mixture becomes homogeneous. Commercial terephthalic acid generally contains a small proportion, e. g. 0.1% by weight, of sodium terephthalate. This is an advantage since the sodium terephthalic is a particularly effective ester-interchange catalyst.

The following examples illustrate the invention; the parts given are by weight:

*Example 1*

18 parts of monomethyl terephthalate containing about 0.1% of its weight of sodium terephthalate and 10.6 parts of cyclic ethylene carbonate (molar ratio of ester to glycol carbonate 1:1.2) were mixed together and heated under reflux to a temperature of 270° C. under nitrogen until evolution of carbon dioxide had ceased. At this stage a small quantity of magnesium ribbon was added, the temperature was taken up to 280° C. for 1½ hours, the reflux condenser was removed and heating was continued, still at 280° C., for a further 6 hours under an absolute pressure of 4 mms. of mercury. The product had a melting point of about 250° C. and was fibre-forming and capable of being cold drawn.

*Example 2*

A low polymer having an intrinsic viscosity of 0.26 was formed from terephthalic acid and cyclic ethylene carbonate using the process of U. S. application S. No. 302,822.

40 parts of this low polymer, 18 parts of monomethyl terephthalate containing about 0.1% of its weight of sodium terephthalate, and 10.6 parts of cyclic ethylene carbonate were mixed together, and heated under reflux to a temperature of 270° C. under nitrogen until evolution of carbon dioxide had ceased. Further monomethyl terephthalate and cyclic ethylene carbonate were then added continuously in constant proportions, the molar ratio of ester to glycol carbonate being 1:1.2, while an equivalent amount of low polymer having an intrinsic viscosity of about 0.26 was continuously withdrawn. This low polymer was worked up to give a fibre-forming product using the procedure described in Example 1.

Having described our invention what we desire to secure by Letters Patent is:

1. Process for the production of a high linear polyester, which comprises heat-condensing a cyclic carbonate of an alkylene glycol with a mono-ester of a dicarboxylic acid and a mono-hydroxy compound which is volatile at the temperature employed said mono-ester having a melting point not higher than 250° C., heating being continued until a high linear polyester has been formed.

2. Process for the production of a high linear polyester, which comprises heat-condensing a cyclic carbonate of an alkylene glycol containing 2–3 carbon atoms in the molecule with a mono-ester of an aromatic dicarboxylic acid having the carboxyl groups in diametrically opposite nuclear positions and a mono-hydroxy compound which is volatile at the temperature employed said mono-ester having a melting point not higher than 250° C., heating being continued until a high linear polyester has been formed.

3. Process for the production of a high linear polyester, which comprises heat-condensing a cyclic ethylene carbonate with a mono-ester of terephthalic acid and a mono-hydroxy compound which is volatile at the temperature employed and has 1–6 carbon atoms in the molecule said mono-ester having a melting point not higher than 250° C., heating being continued until a high linear polyester has been formed.

4. Process for the production of a high linear polyester, which comprises heat-condensing at 200°–300° C. a cyclic carbonate of an alkylene glycol containing 2–3 carbon atoms in the molecule with a mono-ester of an aromatic dicarboxylic acid having the carboxyl groups in diametrically opposite nuclear positions and a mono-hydroxy compound which is volatile at said heat-condensation temperature, heating being continued until a high linear polyester has been formed.

5. Process for the production of a high linear polyester, which comprises heat-condensing at 200°–300° C. a cyclic carbonate of an alkylene glycol containing 2–3 carbon atoms in the molecule with a mono-ester of an aromatic dicarboxylic acid having the carboxyl groups in diametrically opposite nuclear positions and a mono-hydroxy compound which is volatile at said heat-condensation temperature in a molecular ratio to the cyclic glycol carbonate between 1:1 and 1:1.3, heating being continued until a high linear polyester has been formed.

6. Process for the production of a high linear polyester, which comprises heat-condensing at 200°–300° C. in the presence of an ester-interchange catalyst a cyclic carbonate of an alkylene glycol containing 2–3 carbon atoms in the molecule with a mono-ester of an aromatic dicarboxylic acid having the carboxyl groups in diametrically opposite nuclear positions and a mono-hydroxy compound which is volatile at said heat-condensation temperature, heating being continued until a high linear polyester has been formed.

7. Process for the production of a high linear polyethylene terephthalate, which comprises heat-condensing at 250°–300° C., in the presence of an ester-interchange catalyst, cyclic ethylene carbonate with a mono-ester of terephthalic acid and a mono-hydroxy compound which is volatile at said heat-condensation temperature and contains 1–6 carbon atoms in the molecule, heating being continued until a high linear polyethylene terephthalate has been formed.

8. Process for the production of a high linear polyester, which comprises mixing a cyclic carbonate of an alkylene glycol, and a mono-ester of a dicarboxylic acid and a mono-hydroxy compound, with a molten low linear poly-ester of intrinsic viscosity 0.1–0.4 at a temperature above 200° C., said mono-hydroxy compound being volatile at said temperature, heating the mixture until further molten low polyester of intrinsic viscosity 0.1–0.4 has been formed from the cyclic glycol carbonate and the dicarboxylic acid mono-ester, and further heating the low polyester so produced until it is fibre-forming.

9. Process for the production of a high linear polyester, which comprises mixing a cyclic carbonate of an alkylene glycol containing 2–3 carbon atoms in the molecule, and a mono-ester of an aromatic dicarboxylic acid having the carboxyl groups in diametrically opposite nuclear positions and a mono-hydroxy compound, with a molten low linear polyester of intrinsic viscosity 0.1–0.4 at a temperature above 200° C., said mono-hydroxy compound being volatile at said temperature heating the mixture until further molten low polyester of intrinsic viscosity 0.1–0.4 has been formed from the cyclic glycol carbonate and the dicarboxylic acid mono-ester, and further heating the low polyester so produced until it is fibre-forming.

10. Process for the production of a high linear polyester, which comprises mixing cyclic ethylene carbonate, and a mono-ester of terephthalic acid and a mono-hydroxy compound, with a molten low linear polyester of intrinsic viscosity 0.1–0.4 at a temperature above 200° C., said mono-hydroxy compound being volatile at said temperature heating the mixture until further molten low polyester of intrinsic viscosity 0.1–0.4 has been formed from the cyclic ethylene carbonate and the terephthalic acid mono-ester, and further heating the low polyester so produced until it is fibre-forming.

11. Process for the production of a high linear polyester, which comprises mixing 1–1.3 molecular proportions of a cyclic carbonate of an alkylene glycol containing 2–3 carbon atoms in the molecule, and 1 molecular proportion of a mono-ester of an aromatic dicarboxylic acid having the carboxyl groups in diametrically opposite nuclear positions and a mono-hydroxy compound, with a molten low linear polyester of intrinsic viscosity 0.1–0.4 at a temperature above 200° C., said mono-hydroxy compound being volatile at said temperature heating the mixture until further molten low polyester of intrinsic viscosity 0.1–0.4 has been formed from the cyclic glycol carbonate and the dicarboxylic acid mono-ester, and further heating the low polyester so produced until it is fibre-forming.

12. Process for the production of a high linear polyester, which comprises mixing a cyclic carbonate of an alkylene glycol containing 2–3 carbon atoms in the molecule, and a mono-ester of an aromatic dicarboxylic acid having the carboxyl groups in diametrically opposite nuclear positions and a mono-hydroxy compound, with a molten low linear polyester of intrinsic viscosity 0.1–0.4 in the presence of an ester-interchange catalyst at a temperature above 200° C., said mono-hydroxy compound being volatile at said temperature heating the mixture until further molten low polyester of intrinsic viscosity 0.1–0.4 has been formed from the cyclic glycol carbonate and the dicarboxylic acid mono-ester, and further heating the low polyester so produced until it is fibre-forming.

13. Process for the production of a high linear polyethylene terephthalate, which comprises mixing 1–1.3 molecular proportions of cyclic ethylene carbonate, and 1 molecular proportion of a mono-ester of terephthalic acid and a mono-hydroxy compound and contains 1–6 carbon atoms in the molecule, with a molten low linear polyethylene terephthalate of intrinsic viscosity 0.1–0.4 at a temperature of 250° C.–300° C. in the presence of an ester-interchange catalyst, said mono-hydroxy compound being volatile at said temperature heating the mixture until further molten low polyethylene terephthalate of intrinsic viscosity 0.1–0.4 has been formed from the cyclic ethylene carbonate and the terephthalic acid mono-ester, and further heating the low polyethylene terephthalate so produced until it is fibre-forming.

14. Process for the production of a high linear polyester, which comprises continuously mixing, in the presence of an ester-interchange catalyst and at 200°–300° C., 1–1.3 molecular proportions of a cyclic carbonate of an alkylene glycol containing 2–3 carbon atoms in the molecule, and 1 molecular proportion of a mono-ester of an aromatic dicarboxylic acid having the carboxyl groups in diametrically opposite nuclear positions and a mono-hydroxy compound which is volatile at said temperature, with a molten low polyester of intrinsic viscosity 0.1–0.4 derived from the glycol component of the said cyclic glycol carbonate and aromatic dicarboxylic acid, heating the mixture until further molten low polyester of intrinsic viscosity 0.1–0.4 has been formed from the cyclic glycol carbonate and the dicarboxylic acid mono-ester, withdrawing from the mixture part of its content of low polyester, adding more of the dicarboxylic acid mono-ester in amount equivalent to the low polyester withdrawn and more of the cyclic glycol carbonate in a molar ratio to the dicarboxylic acid mono-ester between 1:1 and 1.3:1 with ester-interchange catalyst to replace that withdrawn with the low polyester, continuing to heat the mixture, repeating the withdrawal of molten low polyester and the addition of cyclic glycol carbonate and dicarboxylic acid mono-ester in the specified proportions with ester-interchange catalyst, and further heating the low polyester withdrawn until it is fibre-forming.

15. Process for the production of a high linear polyethylene terephthalate, which comprises continuously mixing, in the presence of an ester-interchange catalyst and at 250°–300° C., 1–1.3 molecular proportions of cyclic ethylene carbonate and 1 molecular proportion of a mono-ester of terephthalic acid and a mono-hydroxy compound which is volatile at said temperature, with molten low polyethylene terephthalate of intrinsic viscosity 0.1–0.4, heating the mixture until further molten low polyethylene terephthalate of intrinsic viscosity 0.1–0.4 has been formed from the cyclic ethylene carbonate and the terephthalate acid mono-ester, withdrawing from the mixture part of its content of low polyethylene terephthalate, adding more of the dicarboxylic acid mono-ester in amount equivalent to the low polyethylene terephthalate withdrawn and more of the cyclic ethylene carbonate in a molar ratio to the terephthalic acid mono-ester between 1:1 and 1.3:1 with ester-interchange catalyst to replace that withdrawn with the low polyethylene terephthalate, continuing to heat the mixture, repeating the withdrawal of molten low polyethylene terephthalate and the addition of cyclic ethylene carbonate and terephthalic acid mono-ester in the specified proportions with ester-interchange catalyst, and further heating the low polyethylene terephthalate withdrawn until it is fibre-forming.

References Cited in the file of this patent

UNITED STATES PATENTS

| | | |
|---|---|---|
| 2,448,767 | Carlson | Sept. 7, 1948 |
| 2,496,933 | Caldwell | Feb. 7, 1950 |